United States Patent [19]

Celenza et al.

[11] Patent Number: 4,888,545

[45] Date of Patent: Dec. 19, 1989

[54] IMPROVED TAP SWITCHING POWER SUPPLY

[75] Inventors: Nicholas Celenza, Durham; Elie M. Najm, Cary, both of N.C.

[73] Assignee: International Business Machines Corp., Armonk, N.Y.

[21] Appl. No.: 201,003

[22] Filed: Jun. 1, 1988

[51] Int. Cl.[4] .............................................. H02M 1/10

[52] U.S. Cl. .................................... 323/258; 323/343; 363/89

[58] Field of Search ........................ 323/257, 258, 343; 363/70, 80, 81, 82, 86, 89

[56] References Cited

U.S. PATENT DOCUMENTS

| | | | |
|---|---|---|---|
| 3,156,860 | 11/1964 | Payntar | 363/89 |
| 3,818,321 | 6/1974 | Willner et al. | 323/258 |
| 4,090,234 | 5/1978 | Bierly | 323/258 |
| 4,323,960 | 4/1982 | Jones | 363/89 |
| 4,454,466 | 6/1984 | Ritter | 323/258 |
| 4,523,265 | 6/1985 | Deprez | 323/258 |
| 4,581,690 | 4/1986 | Russell | 363/80 |
| 4,712,171 | 12/1987 | Yamashita | 363/89 |
| 4,729,083 | 3/1988 | Kyriakos | 363/89 |
| 4,733,158 | 3/1988 | Marchione et al. | 323/258 |

OTHER PUBLICATIONS

Menard et al., "Voltage Regulator for Controlling a DC Motor", IBM Tech. Disc. Bull., vol 13, No. 6, Nov. 70, p. 1516.

*Primary Examiner*—Patrick R. Salce
*Assistant Examiner*—Jeffrey Sterrett
*Attorney, Agent, or Firm*—Joscelyn G. Cockburn

[57] ABSTRACT

Described is a novel power supply for generating a constant d.c. voltage from a variable a.c. voltage supply line. The power supply includes a plurality of switch circuits which monitor voltage levels on respective secondary windings of a power transformer and as voltage levels change, one of the plurality of switch circuits is selected to charge a capacitor which provides a range of d.c. voltages which are processed to provide the constant d.c. voltage.

14 Claims, 1 Drawing Sheet

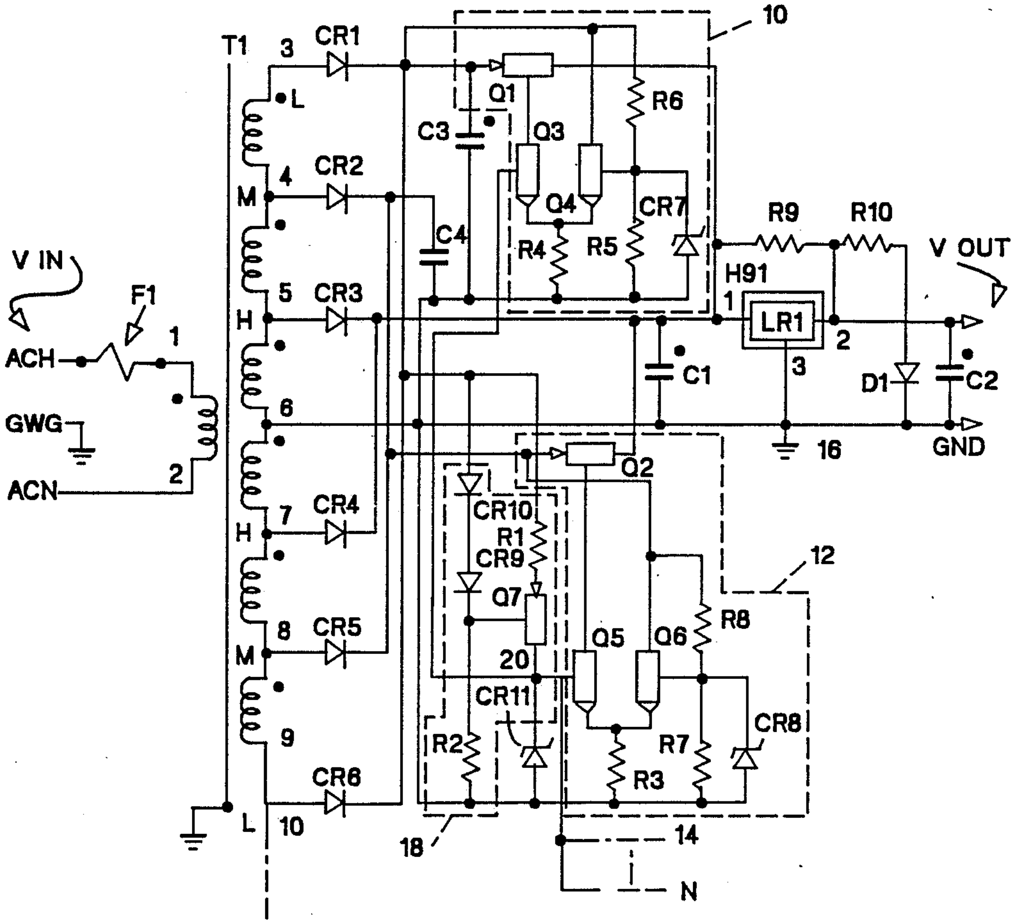
V IN
F1
ACH
GWG
ACN
1
2
T1
3
L
4
M
5
H
6
7
H
8
M
9
L
10
CR1
CR2
CR3
CR4
CR5
CR6
C3
C4
Q1
Q3
Q4
R4
R5
R6
CR7
10
R9
R10
V OUT
H91
1
LR1
2
3
C1
D1
C2
16
GND
Q2
CR10
R1
CR9
Q7
20
CR11
R2
18
Q5
Q6
R3
R7
R8
CR8
12
14
N

TAP SWITCHING POWER SUPPLY

BACKGROUND OF THE INVENTION

1. Field of the Invention

The present invention relates to power supplies in general and more particularly to voltage regulating circuits suitable for processing variable a.c. line voltages to generate rectified d.c. output voltages.

2. Prior Art

Most power supplies, especially the ones that are used in computers and other precision electronic devices are required to provide a fixed voltage at a given current. Usually, the allowed deviation at full load, is within the range of ±5%. Preferably, the power supply should be low-cost and consume a relatively small amount of power.

A typical power supply includes a power transformer with a primary winding which is connected to an a.c. input line voltage and one or more secondary windings disposed relative to the primary winding. Rectifying circuits are connected to the secondary windings. The rectifying circuits process the a.c. voltages appearing on the secondary winding to provide a desired d.c. output voltage across a bulk capacitor.

One of the problems which a designer faces is that the input a.c. line voltage varies over a wide range. An obvious solution is to design a regulating circuit which dissipates a relatively large amount of power. Thus, as the input AC line voltage varies from minimum to maximum, more power is consumed within the regulating circuit to provide a desired voltage at a given current. Such a design is unacceptable because the regulating unit usually dissipates a relatively large amount of energy and its cost is also relatively high. It is believed that the high cost stems from the fact that the components which are used in such devices are specified to match the high energy that has to be dissipated rather than the power which the devices output. It is common knowledge that for most designs unit cost and power rating are closely related. Thus, as the power rating increases, the unit cost increases and vice versa. Therefore, it is desirable to design a device with components dissipating close to the output power rating rather than with components rated for higher power due to circuit inefficiency.

The prior art has recognized the problem associated with the above-described design and sets forth alternative designs. U.S. Pat. No. 3,921,059 is an example of the prior art alternative design. In that patent multiple triac taps connected to secondary windings of a power transformer are switched to provide a range of output voltages. A control circuit including a shift register and optical isolator drivers are used to switch the triacs.

U.S. Pat. No. 4,454,466 describes a power supply in which switched primary windings provide a variable voltage which is processed by a series regulator to output a fixed voltage to a load. An up-down counter circuit arrangement is used for driving switches that select the primary windings which are needed to provide a desired output voltage.

IBM Technical Disclosure Bulletin (Vol. 13, No. 6, Nov. 1970, pp. 1516–1517) and U.S. Pat. No. 4,090,234 describe a voltage regulating circuitry in which diodes and SCR taps are made selectively conductive to effectively vary the turn ratio of the secondary winding of a power transformer.

Even though the above devices work well for their intended purpose, they are plagued by problems which adversely affect their use. Probably the most pressing problem is that the automatic tap settings have to be latched. This means that the tap switching to select coils cannot be done instantaneously, since the counters and/or latches which provide the latching function cannot be changed instantaneously. In other words, the rate at which the latching elements are changed is the rate at which the coils can be switched. Counters and other latching elements can only be changed on every clock cycle. Thus, the coils can only be switched on a clock cycle basis only. Any attempt to switch coils during a clock cycle is prohibited. However, there are several sensitive devices (such as computers, etc.) that require regulating circuits in which the coils must be switched instantaneously. As to those devices, the prior art regulating circuits and/or power supplies cannot be used.

It is noted that the regulating circuits of the Technical Disclosure Bulletin and the '234 patent uses SCRs instead of latches. However, one of the inherent characteristics of an SCR is that it must remain in a desired state (i.e., conductive or non-conductive) for a complete clock cycle before it can be changed. Thus, in that regard, the SCR operates as a latch. In addition, the '234 patent requires a separate power supply for driving the SCR. This requirement makes the circuit more complicated and increases its cost. The increased cost also affects the '466 patent since switching is done on the primary side of the transformer and as a result the components are overdesigned in order to handle the high current and/or voltage in the primary windings. Also, some of the prior art references use opto-isolation and/or triacs in the switching circuits. These components are expensive and increase the overall cost of the power supply.

SUMMARY OF THE INVENTION

It is therefore the general object of the present invention to provide a power supply and/or a regulating circuit that is more efficient than was previously possible.

The improved power supply includes a linear regulator connected via a bulk capacitor charged by a plurality of switch circuit arrangements that monitor the voltage level on assigned taps of the secondary windings of a power transformer and as the voltage level changes on respective windings, different ones of the plurality of switching circuit arrangements are automatically selected so that the bulk capacitor is charged by different turn ratio of the secondary windings.

An output capacitor is connected across the output terminals of the linear regulator. The voltage range across the bulk capacitor is controlled by the number of taps on the secondary windings and the number of switch circuit arrangements. Thus, as the number of taps and switch circuits increase, the voltage window across the bulk capacitor decreases and the power which is dissipated in the linear regulator also decreases.

The taps are formed from a plurality of diodes connected to selected points on the secondary windings. A center tap conductor interconnects a center tap of the secondary windings to a ground potential. Each diode is connected to a switch circuit arrangement which includes a switch transistor connected in series with the diode. A differential amplifier means is connected to the switch transistor and a voltage reference generating means is connected to the differential amplifier.

The foregoing and other objects, features and advantages of the invention are more fully described in the accompanying drawings.

BRIEF DESCRIPTION OF THE DRAWINGS

The sole FIGURE shows a schematic of the improved power supply according to the teachings of the present invention.

DESCRIPTION OF THE PREFERRED EMBODIMENT

The sole figure shows an improved power supply according to the teachings of the present invention. The structure and the theory of operation are as follows: a plurality of diode taps (CR1 through CR6) are placed on the secondary windings of a power transformer. The diode taps are connected to a plurality of tap selection circuit arrangements which select a different group of secondary coils to charge capacitor C1 as input a.c. line voltage varies across the primary winding of the power transformer. A linear circuit arrangement (LR1) processes the voltage generated across capacitor C1 to provide a fixed voltage Vout at a desired current across capacitor C2.

Referring to the sole figure, the major sub-assemblies of the improved power supply include an output capacitor C2, linear regulator circuit arrangement LR1, window capacitor C1, power transformer including primary winding 1-2 and a plurality of secondary windings 3-4, 4-5, 5-6, 6-7, 7-8, 8-9, 9-N, a plurality of diode taps (CR1 through CR6) and a plurality of tap selection circuit arrangements 10, 12, 14 . . . N.

The output capacitor C2 provides more filtering for the output voltage. In the preferred embodiment of this invention the fixed output voltage is 5 v ±5% at 0.5 amps maximum load.

Of course, it is within the skill of the art to provide other output power ratings without deviating from the teachings of the present invention. The linear regulator circuit arrangement takes the voltage provided across C1, regulates it and outputs a desired voltage. The linear regulator is a conventional off-the-shelf module which contains the necessary circuit arrangement for regulating the input voltage. In the preferred embodiment of the invention a linear regulator module L7800 manufactured by SGS Corporation was used. Of course, other types of regulating circuit arrangements can be used without departing from the scope of the present invention.

The tap selection circuit arrangements 10, 12, 14-N are identical. Their function is to monitor assigned taps or points on the secondary windings and to select a different set of secondary coils which charge capacitor C1 as the input a.c. line voltage across terminals ACH and ACN fluctuates within preassigned voltage range.

The preassigned voltage range is separated into a plurality of different groups with each group covering an assigned voltage range. Likewise, the secondary windings are separated in a plurality of different groups of windings or coils. Preferably, the number of groupings for the input voltage range and the secondary coils should be identical. Thus, if the variable input voltage range is separated into n groups, the secondary windings should also be separated into n groups. Further, a different group of windings should be selected to charge C1 as the input a.c. line voltage varies within its assigned voltage range.

In the preferred embodiment of this invention the input a.c. line voltage fluctuates between 70 v a.c. and 259 v a.c. The input a.c. line voltage is separated into three equal voltage ranges, namely: 70-107, 107-163 and 163-259 v a.c. Also, the secondary coils are arranged into groups identified by alphabetical characters LL, MM and HH. For this embodiment, the a.c. line voltage and the windings are arranged into like groupings. A center tap conductor 16 interconnects the center tap of the secondary windings to a ground potential. Even though a three-tap winding was used to process the input a.c. voltage, this should not be construed as a limitation on the scope of the present invention since it is within the skill of the art to increase or decrease the number of secondary taps or division of the input line voltage without departing from the spirit and scope of the present invention. As will be explained subsequently, the higher the number of taps, the lower the voltage window on the bulk capacitor C1 and thus less energy will be required to be dissipated across the linear regulator in order to provide a fixed voltage at the output. It should also be noted that N as shown in the sole figure signifies that additional secondary coils with associated taps and selection circuit arrangements can be used.

Still referring to the sole figure, the voltage which is provided across each group of coils is rectified and is switched by one of the tap selection circuit arrangements for charging C1. Thus, the voltage appearing across L6 is rectified by components CR1, CR6 and C3. Likewise, the voltage appearing across terminal M6 is rectified by diodes CR2, CR5 and capacitor C4. Finally, the voltage appearing across terminal H6 is rectified by diodes CR3 and CR4 and C1. It should be noted that when the input a.c. voltage is within its low range (say, 70 v a.c. to 107 v a.c.) the voltage across terminal L6 is selected to charge C1. Similarly, when the input voltage is in its mid-range, say, between 107 v a.c. to 163 v a.c. the voltage across terminal M6 is selected for charging capacitor C1. Finally, when the input a.c. line voltage is within its upper range, say, 163 v a.c. to 259 v a.c., the voltage across terminal H6 is used for charging C1.

As stated above, the tap selection circuit arrangement which selects the set of coils which is used for charging C1 is identical. Thus, only one of these circuits identified by numeral 10 will be described in detail, it being understood that the other circuits (including the one identified by numeral 12) are identical in structure and function in like manner as the detailed circuit.

Still referring to the sole figure, each of the tap selection circuits is comprised of a switching transistor such as Q1 which is coupled to a differential amplifier formed by transistors Q3 and Q4. For brevity, different numerals Q2, Q5, etc. are used to identify components in circuit arrangement 12 that are similar to components in circuit arrangement 10. The emitter terminals of the differential amplifier transistors are connected through resistor R4 to ground. A zener diode CR11 is coupled to a constant current source formed by circuit arrangement 18. The zener diode and its associated current source provide a reference voltage of approximately 5 v to the base of Q3 and the bases of similar situated transistors of differential amplifiers which are attached to node 20.

Still referring to the sole figure, a more detailed description of the improved power system is given. Component CR11 is a 5 v zener diode which provides a 5 v reference signal on node 20. Components CR9, CR10, R1, R2 and Q7 constitute a 6 milliamp constant current source which limits power dissipation in zener diode CR11. The high transformer output voltage which is provided across terminal L-6 is rectified by components CR1, CR6 and C3. Components Q3, Q4 and R4 form a differential amplifier. R5 and R6 form a voltage divider and are selected such that the base of Q4 reaches 5.0 v when VC3 reaches 11.5 v. The emitter-collector voltage of Q1 (VQ1CE) is one volt. For VC3 less than 11.5 v, Q4 is off and Q3 is on. For VC3 higher than 11.5 v, Q4 is on and Q3 is off. It should be noted that Q1 is on whenever Q3 is on and as a result C1 is charged. CR7 is a 7.4 v zener diode and is needed to prevent emitter to base breakdown of Q3. It should be noted that without CR7, VQ4 base would go up to approximately 17 v when VIN reaches approximately 259 v a.c.

The medium transformer voltage across terminal M-6 is rectified by devices CR2, CR5 and C4. A differential amplifier is formed by devices Q5, Q6 and R3. R7 and R8 form a voltage divider. The values of the resistors are selected such that the voltage on the base of Q6(VQ6) reaches 5 v when VC4 reaches 11.5 v. Simultaneously, the voltage across VQ2CE is 1 v. If VC4 is lower than 11.5 v, Q6 is off and Q5 is on. If VC4 is hgher than 11.5 v, Q6 is on and Q5 is off. With Q5 on, Q2 is also on and charges up C1. CR8 is a zener diode which prevents Q5 emitter to base breakdown. Absent the zener diode, VQ5 base would go up to approximately 10.5 v when VIN is approximately 259 v a.c.

For a.c. input voltage greater than 163v a.c., both VC3 and VC4 are higher than 11.5 v. Thus, Q1 and Q2 are off and C1 gets charged through diodes CR3 and CR4. In other words, the voltage across terminals H-6 charges up C1. Operation:

In operation, zener diode CR11 and its associated current source 18 set a reference voltage approximately 5 v on the base of devices Q5 and Q3, respectively. This forces both devices to conduct simultaneously. As a result, Q1 and Q2 also conduct. When the voltage of the primary winding is within a low range, say, between 70 v a.c. to 107 v a.c., a high voltage is reflected across the coils in terminal L-6. Switching transistor Q1 of coil selection circuit means 10 conducts and charges up C1. The diodes CR2-CR5 are reversed biased and, as a result, the voltage across terminals M-6 and H-6 do not charge capacitor C1. When the voltage on the base of Q4 exceeds 5 v, Q1 and Q3 are turned off and Q4 conducts. Similarly, when the input voltage VIN is within the range of 107 v a.c. to 163 v a.c., the voltage generated across terminals M-6 causes current to flow through Q2 and charges up C1. Finally, when the input voltage is within its maximum range, 163 v a.c. to 259 v a.c., the voltage across terminals H-6 charges up capacitor C1.

It should be noted that by arranging the output coils into a plurality of electronically switched center tap outputs and providing tap selection circuit arrangement which selects appropriate taps and group of coils as the a.c. input line voltage varies a power supply is provided which dissipates minimum amount of power across the linear regulator circuit arrangement LR1. It should also be noted that in the preferred embodiment the input a.c. line voltage is separated into three identical voltage ranges, high, medium and low. However, it should be noted that this is only for purposes of explaining applicants' invention and does not limit the invention in any way. Also, the invention may be implemented in a fullwave or halfwave rectifier circuitry.

With the particular arrangement of the circuit in the sole figure, the voltage across capacitor C1 is between 5.7 v to 10.5 v for each voltage range of the input a.c. line voltage. The voltage across C1 is achieved by proper selection and arrangement of the transformer windings. Thus, for an input line voltage which ranges between 70 v a.c. to 259 v a.c., when the line voltage is between 70 v a.c. and 107 v a.c., the voltage across capacitor C1 fluctuates between 5.7 and 10.5 v. Similarly, for line voltage between 107 v a.c. and 163 v a.c. the voltage across C1 fluctuates between 5.7 and 10.5 v and when the line voltage is between 163 v a.c. and 259 v a.c., the voltage across C1 is between 5.7 v and 10.5 v. Thus, since the voltage swing across C1 is relatively low (5.7 v to 10.5 v), the maximum power consumed in the linear regulator LR1 is relatively low. This can be shown mathematically as follows:

$$P = VI,$$

where P=power

V=voltage

I=current

With reference to the sole figure, $$PLR1 = Io(VC1 - Vo) \qquad \text{(Equation 1)}$$

where PLR1 represents power consumed by the linear regulator, $VC_1$ represents voltage on C1; Vo represents Vout and Io represents output current.

Thus, when VC1=5.7 volts, Vo=5 volts and Io=1 amp, only 0.7 watt is dissipated in the linear regulator. Likewise, if 10.5 volts are generated on C1, only 5.5 watts are dissipated in the linear regulator. It should be noted that if additional coils and coil selection circuitry are added to the sole figure the power which is consumed in the linear regulator module will be even less.

In contrast with no switching of transformer taps, the voltage across C1 varies between 5.7 volts and 20.1 volts. When the voltage across C1 is 20.1 volts, 15.1 watts are dissipated in the linear regulator. The wattage is obtained by substituting 20.1 volts in Equation 1 above. Likewise, by comparing the power consumption with tap switching and the power consumption without tap switching, it can be shown that tap switching provides a saving of 9.6 watts. Stated another way, a significant amount of energy is saved when one uses the tap switching topology disclosed above. For the specific example described above, the savings are 9.6 watts.

Several advantages inure to one who uses the teachings of the present invention. Among the advantages are an improved power supply with the following characteristics:

1. Low power dissipation.

2. Low cost due to the fact that the power rating of the components is relatively low.

3. Low failure rate of the components used to manufacture the power supply.

4. No EMC filter or shielding is required because no high frequency switching is needed.

5. No tap selections latching, thus the switching circuits can respond to instantaneous changes occurring at the a.c. input line voltage.

While the invention has been particularly shown and described with reference to the preferred embodiment thereof, it will be understood that various changes in form and details may be made therein without departing from the spirit and scope of the present invention.

We claim:

1. An improved power supply for providing a constant voltage at a constant current comprising:

a linear regulator circuit arrangement;

a bulk capacitor for providing a voltage that varies within a relatively narrow range connected to said linear regulator;

a power transformer comprising a primary winding for coupling to a variable input supply voltage source and a plurality of secondary windings coupled in series and disposed relative to the primary windings;

a plurality of coil selection circuit arrangements connected to the secondary windings; said plurality of coil selection circuit arrangements directly monitoring coil voltages developed on the plurality of secondary windings and generating therefrom a plurality of different control voltages which are compared simultaneously with a fixed reference voltage and the selection circuit arrangement whose control voltage falls within a selected range of values conducts current from its secondary winding to charge the bulk capacitor until the selected range of values is exceeded whereby the selection circuit arrangement which is presently charging the capacitor is deactivated and another selection circuit arrangement whose control voltage falls within the selected range of values is activated to charge the capacitor.

2. The power supply of claim 1 further including a plurality of circuit means for rectifying current connected to the secondary windings and the plurality of coil selection circuit arrangements.

3. The power supply of claim 2 wherein the circuit means includes diodes.

4. An improved voltage regulating circuit for use in an improved power supply comprising:

a power transformer having a primary winding and a plurality of scondary windings;

a plurality of diodes one of each connected to a secondary winding and cooperating with a reference tap on said secondary windings to provide an output voltage at a first node;

a capacitor connected to said first node; and a plurality of coil selection means interconnecting said diodes to the capacitor; said plurality of coil selection circuit arrangements monitoring voltages developed on the plurality of secondary windings and generating therefrom a plurality of control voltages which are compared simultaneously with a fixed reference voltage and the selection circuit arrangement having a control voltage that is within a selected range of values conducts current from its secondary winding to charge the bulk capacitor.

5. The improved voltage regulating circuit of claim 4 wherein the coil selection means include a first transistor having a first electrode connected to the diodes, a second electrode connected to the capacitor and a third electrode connected to a differential amplifier means which allows the first transistor to conduct when an input voltage measured at said coil falls within a selected range of values and not to conduct when the input voltage falls outside of the range of values.

6. The imprvoed voltage regulating circuit of claim 5 wherein the differential amplifier means includes a first transistor and a second transistor arranged in a parallel configuration with an electrode from each transistor connected to a second node; a first resistor interconnecting the second node to the reference tap;

a pair of series connected resistors connected to the diode and the reference tap, said series connected resistors generating a voltage which is proportional to the voltage generated on said coil and applying said voltage to a base electrode of the first transistor; and a zener diode connected to the reference tap and a base electrode of the second transistor.

7. The improved power supply of claim 1 or claim 6 wherein each of the plurality of coil selection circuit arrangements includes a switch means coupled to a selected set of windings and the bulk capacitor; a circuit arrangement for generating the control voltage coupled to the coil; and a differential amplifier means interconnecting the switching means and the circuit arrangement.

8. The power supply of claim 7 further including a conductive means interconnecting a center tap on said secondary windings to a ground potential; and a zener diode having an anode electrode connected to the conductive means and a cathode electrode connected to the differential amplifier means.

9. An improved voltage regulating circuit arrangement comprising:

a power transformer having a primary winding and a plurality of secondary windings;

a plurality of first means one of each associated with a secondary winding said first means rectifying a voltage signal generated by said one secondary winding;

a second means connected to the first means; said second means only monitoring the voltage on said secondary windings and to generate a first reference voltage therefrom;

a third means for generating a second reference voltage;

a switchable means connected to the first means;

a storage means connected to the switchable means;

a linear circuit arrangement connected to the storage means for providing a constant current at a constant voltage level; and a controller means connected to the switchable means; said controller means correlating the first reference voltage and the second reference voltage and causing said switchable means to charge the storage means if the first reference voltage is less than the second and to inhibit said switchable means from charging the storage means if the second reference voltage exceeds the first reference signal.

10. The improved voltage regulating circuit of claim 9 wherein the plurality of first means include a plurality of diodes.

11. The improved voltage regulating circuit of claim 9 wherein the second means includes a zener diode.

12. The improved voltage regulating circuit of claim 9 wherein the third means includes a pair of series-connected resistors.

13. The improved voltage regulating circuit of claim 9 wherein the controller means includes a differential amplifier.

14. An improved power supply for providing a constant voltage at a constant current comprising:

a linear regulator circuit arrangement which receives voltages within a range of values and generate the constant current at the constant voltage;

a bulk capacitor for providing the voltages connected to said linear regulator;

a power transformer comprising a primary winding for coupling to an input supply voltage source whose voltages vary within a relatively wide range of values and a plurality of secondary windings coupled in series and disposed relative to the primary windings with each set of secondary windings generating voltages within a selected range of values wherein the summation of said range of values approximates the range of values for said input supply voltage;

at least one coil selection circuit arrangement connected to the secondary windings with said one coil selection circuit arrangement including a switching transistor with a first electrode coupled to said windings; a voltage divider means connected to the one set of the windings said voltage divider means only monitoring the voltage on the one set of windings; and only generating a control voltage that is directly proportional to the voltage on said windings; and a differential amplifier means connected to the switching transistor and the voltage divider means with said differential amplifier means causing the switching transistor to convey current from said at least one set of the windings to charge the bulk capacitor if the control voltage falls within a selected voltage range and to deactivate the switching transistor that is currently charging the bulk capacitor if the control voltage falls outside of the selected voltage range.

* * * * *